United States Patent

Eguchi et al.

[11] Patent Number: 5,987,193
[45] Date of Patent: *Nov. 16, 1999

[54] IMAGE WRITING DEVICE AND METHOD

[75] Inventors: Tatsuya Eguchi, Toyohashi; Takatoshi Hamada, Toyokawa, both of Japan

[73] Assignee: Minolta Co., Ltd, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/650,667

[22] Filed: May 20, 1996

[30] Foreign Application Priority Data

May 26, 1995 [JP] Japan ..................... 7-128114

[51] Int. Cl.⁶ ............... G06K 9/00; B41J 2/145
[52] U.S. Cl. ............... 382/318; 347/41; 347/240
[58] Field of Search ............... 382/312, 324, 382/318, 273; 347/237, 247, 233, 234, 235, 239, 240, 243, 249, 900, 41; 358/494, 296, 300

[56] References Cited

U.S. PATENT DOCUMENTS

| | | | |
|---|---|---|---|
| 4,393,387 | 7/1983 | Kitamura | 347/240 |
| 5,079,563 | 1/1992 | Starkweather et al. | 347/41 |
| 5,189,710 | 2/1993 | Holt | 382/273 |

FOREIGN PATENT DOCUMENTS

| | | | |
|---|---|---|---|
| 63-170819 | 11/1988 | Japan | H04N 1/04 |
| 2 069 176 | 8/1981 | United Kingdom | G02B 27/17 |

*Primary Examiner*—Thomas D. Lee
*Assistant Examiner*—Wenpeng Chen
*Attorney, Agent, or Firm*—McDermott, Will & Emery

[57] ABSTRACT

A method and apparatus for high resolution multibeam scanning at constant line intervals is disclosed, wherein simultaneous transfer of image data is achieved via multi-beam scanning. According to the present invention, exposure scanning is accomplished a plurality of times relative to a single image surface of n scan lines. Each exposure scan is accomplished simultaneously relative to the total M lines using M individual light beams. Each of M individual beams are positioned such that there is a distance of M lines between adjacent beams. Each individual laser beam is used for exposure scanning of mutually different lines. Therefore, the scan lines of the various beams in a next scan cycle are apart (M−1) lines from the scan lines in the previous scanning cycle. In one embodiment of the invention, an image memory controller reads out image data from an image memory in the scan sequence rather than in the line array sequence. In another embodiment of the invention, the image memory controller reads out image data from an image memory in the line array sequence.

18 Claims, 10 Drawing Sheets

IMAGE WRITING DEVICE AND METHOD

BACKGROUND OF THE INVENTION

1. Field of the Invention

The present invention relates to image writing devices and methods for reproducing electronic images, and more specifically to image writing devices and methods that are less costly to implement and faster than heretofore known image forming devices.

2. Description of the Related Art

In image forming apparatuses of the electrophotographic type such as page printers, digital copying machines and the like, print heads of the mechanical scanning type which scan (a "main scan") by deflecting a laser beam via a polygonal mirror are widely used as an image writing means, wherein a photosensitive member is at least partially optically exposed in accordance with image information.

Multibeam scanning, wherein a plurality of laser beams are used to simultaneously scan a plurality of lines, is effective in shortening the time required to expose a single image surface by laser beam. For example, if two lines are scanned simultaneously, the time required for exposure is theoretically ½ the time required when scanning one line at a time.

In multibeam scanning, however, wherein a plurality of adjacent lines are simultaneously scanned, there is a limit to the reduction in line pitch due to restrictions in the dimensions of the light source. That is, it is difficult to attain high resolution.

Heretofore, methods have been proposed for simultaneously scanning a plurality of lines at set line intervals of a constant number of lines (Japanese Unexamined Patent Application No. SHO 56-110960).

In image forming apparatuses such as page printers and the like, an image is hypothetically drawn on an image memory prior to exposure scan. Thus, image data (bitmap data) in pixel units expressing an image are transmitted from image memory to the control unit of the laser light source for each exposure scan, so as to modulate the laser beam in accordance with said image data.

When scanning is accomplished by a single laser beam, image data may be sequentially transmitted from the image memory to the control unit one line at a time from the first line.

When simultaneously scanning M lines at a constant line interval, however, suitable scanning cannot be accomplished only by transmitting image data sequentially from the first line. The above-identified Japanese patent application did not specifically address a suitable method for transferring image data.

There thus exists a need for an image writing device and method that is capable of providing for simultaneous transfer of image data when using multibeam scanning. Moreover, there is a need for an image writing device and method that can accomplish high speed simultaneous transfer of image data at relatively low cost.

OBJECTS AND SUMMARY

An object of the present invention is to therefore provide a method and apparatus for high resolution multibeam scanning at constant line intervals.

Another object of the present invention is to provide a method and apparatus for simultaneous transfer of image data when using multibeam scanning.

Still another object of the present invention is to provide a method and apparatus for high speed multibeam scanning at lower costs than prior art devices.

In the present invention, exposure scanning is accomplished a plurality of times relative to a single image surface of n scan lines. As a rule, each exposure scan is accomplished simultaneously relative to the total M lines using M individual beams. Each of M individual beams are positioned such that there is a distance of M lines between adjacent beams. Each individual laser beam is used for exposure scanning of mutually different lines. That is, the scan lines of the various beams in a next scan cycle are apart (M−1) lines from the scan lines in the previous scanning cycle.

When M=2, for example, in a particular exposure scan cycle, the first line and the fourth line located two lines from the first line are the scan lines. In the next exposure scan cycle, the third line located at one (=2−1) line apart from the first line, and the sixth line located at one line apart from the fourth line, are the scan lines. Thereafter, the lines located at the back edge of one line interval relative to the previous scan lines are the next scan lines.

The scan lines thus move from the top side of an image to the bottom, and the scan lines of a first scan are the first and fourth lines. The second line is therefore omitted. To cure this omission, the scan line of a first scan may be designated as the second line only, and all lines can then be scanned by designating the first and fourth lines for the scan lines of the second scan.

In accordance with one embodiment of the present invention, an image memory control means reads out image data from the image memory in the scan sequence, i.e., the order in which the scan lines shift as described previously, rather than in the line array sequence.

When M=2, a buffer input control means stores image data of odd numbered lines and stores image data of even numbered lines in two separate buffer memories. A buffer output control means reads from the buffer memories the image data of the line to be scanned simultaneously with each exposure scan.

A beam control means independently modulates laser beams corresponding to each buffer memory in accordance with the image data values read out from each buffer memory.

In another embodiment of the present invention, the image memory control means reads the image data from the image memory in the line array sequence. The buffer input control means divides each buffer memory by line units into mutually different storage capacities, and stores the image data read from the image memory therein. At the point it becomes possible to read the image data of the simultaneous scans, the buffer output control means reads the image data of the scan line from each buffer memory and transmits said image data to the laser beam control means.

Image data read first from the image memory is delayed longer than the image data read later from the buffer memory, and the image data sequence is changed from the line array sequence to the scan sequence by the buffer control means.

As will be explained more fully herein, the present invention provides an apparatus and method for multibeam scanning that may be implemented using fewer components, and therefore at lower cost, than previous devices. Moreover, because the present invention is capable of providing simultaneous transfer of image data, the present apparatus and method is faster than prior art devices using line by line data transfers.

The present invention, including all attendant features and advantages, will be best understood by reference to the following detailed description of the invention, taken in conjunction with the accompanying drawings.

DETAILED DESCRIPTION OF THE INVENTION

Figure 1:
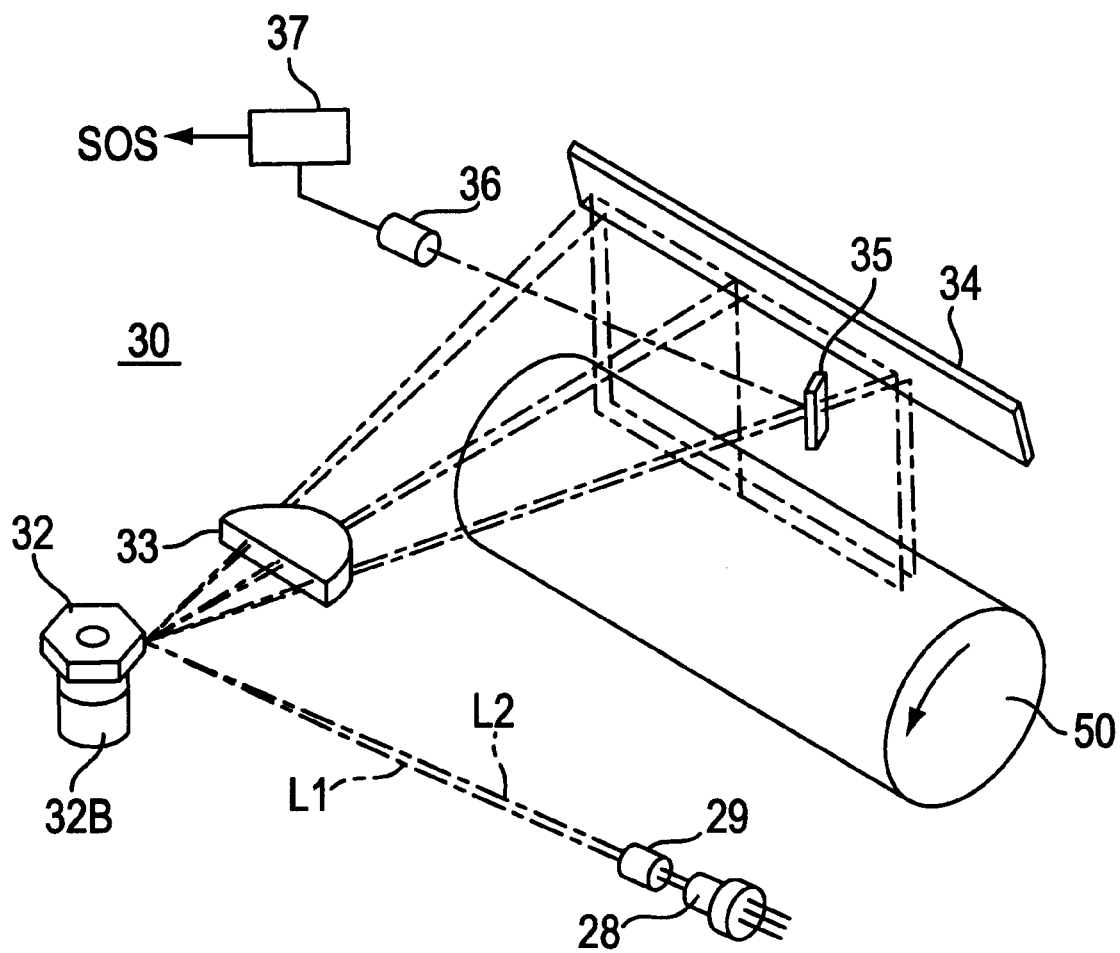
FIG. 1 shows the construction of an optical unit of the present invention.

FIG. 1 shows the construction of the optical unit 30 of a laser printer of the electrophotographic type incorporating the present invention.

Optical unit 30 is an optical exposure means used in the electrophotographic process, and is provided with a semiconductor laser (LD) 28 of a dual beam output type as a light source. Semiconductor laser 28 is controlled in accordance with image information within a page memory 11 to be described later, and emits laser beams L1 and L2 which are mutually independently modulated.

Laser beams L1 and L2 are collimated by a cylinder lens 29, and deflected in the main scan direction (defined by the rotational axis direction of a photosensitive drum 50) by a polygonal mirror 32. The deflected laser beams L1 and L2 pass through fθ lens 33, and thereafter are guided to photosensitive drum 50 by a stationary mirror 34. Photosensitive drum 50 is rotatably driven in one direction so as to accomplish scanning in the subscan direction.

When scanning is accomplished by laser beams L1 and L2, said laser beams L1 and L2 are guided to a photosensor 36 by a half mirror 35 at the starting position of the scan line. The detection signal of photosensor 36 is subjected to waveform shaping by SOS sensor circuit 37, and used as the reference signal SOS for start timing of the main scan.

Figure 2:
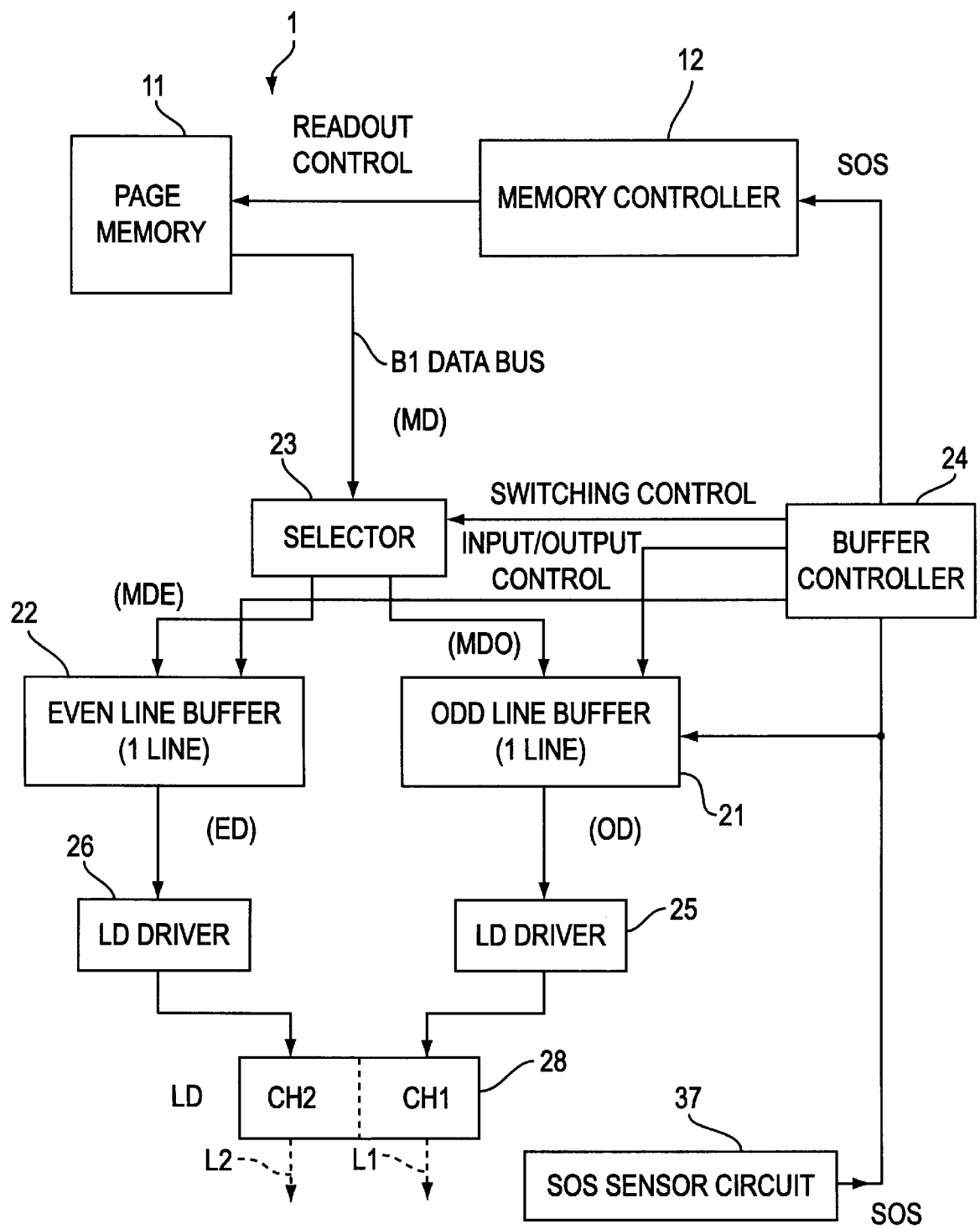
FIG. 2 is a block diagram of a first embodiment of an image writing device.

FIG. 2 is a block diagram of an image writing device 1 for use in the laser printer of FIG. 1.

Image writing device 1 comprises a page memory 11 which is a bitmap area for storing image data MD, memory controller 12 for controlling the readout from page memory 11, LD drivers 25 and 26 for driving semiconductor laser 28, odd line buffer 21, even line buffer 22, selector 23 for switching the transmission of image data MD, buffer controller 24 for switchably controlling selector 23 and input/output control of the two line buffers 21 and 22, and the previously mentioned SOS sensor circuit 37.

Odd line buffer 21 and even line buffer 22 are capable of storing one line of image data MD. Memory controller 12 and buffer controller 24 receive the signals SOS from the SOS sensor circuit 37.

Page memory 11 and memory controller 12 are provided with data processing sections for handling communications with the host, and the essential elements of other components such as the LD drivers 25 and 26 are provided in the print head of the engine unit which handles the electrophotographic process.

In image writing device 1, image data MD are serially transferred pixel by pixel from page memory 11 to selector 23 via a data bus B1 comprising a flat cable (harness) having signal lines in accordance with the number of bits per pixel (e.g., 8-bits: 256 grayscales) of image data MD.

Figure 3:
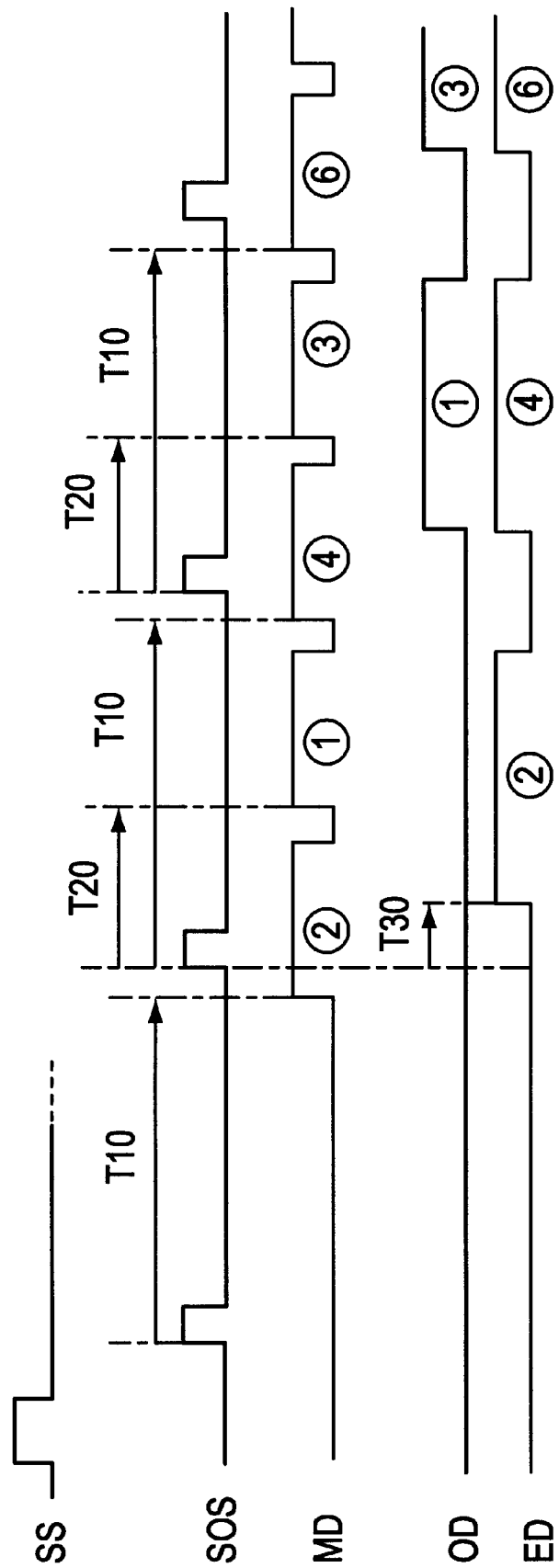
FIG. 3 is a timing chart of the operation of the image writing device of FIG. 1.
Figure 4:
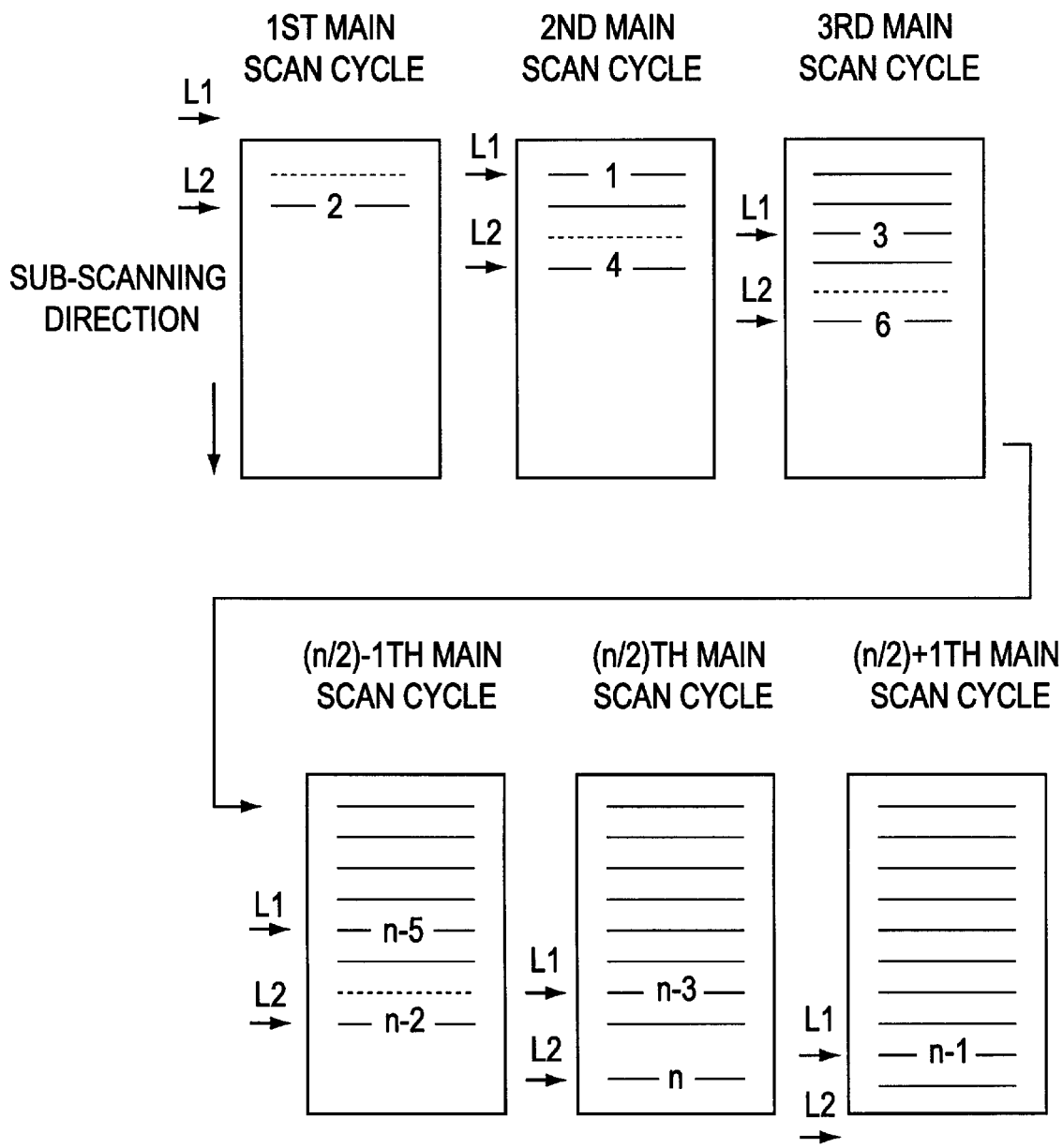
FIG. 4 shows the sequence of each line of the main scan.

FIG. 3 is a timing chart for the operation of the image writing device of FIG. 1, and FIG. 4 shows the sequence of the main scan of each line. In FIG. 3, the circled numerals express the line array sequence position (number). For example, ② expresses the data of the second line in the image.

As shown in FIG. 3, image data MD is not in line array sequence, but is instead transferred from page memory 11 to selector 23 in a sequence corresponding to the scan sequence of FIG. 4. That is, after the SS signal is input indicating the start of a one-page exposure, the memory controller 12 starts timing the delay time T10 from the input of the first signal SOS, and reads out image data MD of the second line after said delay time T10 has elapsed. Then, the passage of the delay time T20 from the input of the second signal SOS is awaited, the image data MD of the first line are read out, the passage of delay timer T10 is awaited and the image data MD of the fourth line are read. Delay times T10 and T20 are set beforehand so that the periods for reading different lines do not overlap; delay time T20 is about ½ the delay time T10.

Thereafter, until the reading of all lines (n number of lines in the present instance) is completed, image data MD of predetermined lines are read at the moment delay times T10 and T20 have elapsed for each input of the SOS signals, and the image data MD are serially transferred to selector 23 in the proportion of 2-lines per 1 main scan cycle. Accordingly, after the input of signal SS, image data MD are input to selector 23 by shifting the sequence in line units so as to input even-, odd-, even-, odd-numbered lines.

Returning to FIG. 2, buffer controller 24 stores image data MDE of even-numbered lines among image data MD transferred from page memory 11 in the even-line buffer 22, and stores image data MDO of odd-numbered lines among image data MD transferred from page memory 11 in odd-line buffer 21.

Buffer controller 24 times the delay time T30 for each input of signal SOS from the second such input, and reads out the image data MDE of one line from even-line buffer 22 at the moment said delay time T30 has elapsed, and transfers said image data to LD driver 26 as modulation data ED, and simultaneously therewith reads out the image data MDO of one line from odd-line buffer 21, and transfers said image data to LD driver 25 as modulation data OD. At the time of the first transfer (corresponding to the second line only), the odd-line modulation data OD are not transferred. White space data may be stored beforehand in odd-line buffer 21 so as to not be transferred with modulation data OD. Delay time T30 is set so that the timing for reading each pixel from even-line buffer 22 is after the storage timing.

LD driver 25 controls the drive current of a first channel CH1 of the semiconductor laser 28 based on the modulation data OD so as to modulate the first laser beam L1. LD driver 26 controls the drive current of a second channel CH2 of semiconductor laser 28 based on the modulation data ED so as to modulate the second laser beam L2. Thus, multibeam scanning is accomplished simultaneously at two locations by two beams.

As shown in FIG. 4, the positional relationship of the two areas on the exposed surface produced by the two laser beams L1 and L2 are separated in the subscan direction by only a three line pitch width with laser beam L1 as the top line. That is, there is two scan lines separating laser beams L1 and L2. The subscan speed (rotational speed of photosensitive drum 50) is set such that the laser beams L1 and L2 move only a two line pitch per one main scan cycle.

Thus, main scans are simultaneously accomplished for a total of two lines separated by a distance of a two line pitch comprising the number of laser beams and the same number of scan lines. The scan lines of laser beam L1 are therefore separated by (2-1) lines, and the scan lines of laser beam L2 are also separated by (2-1) lines.

In the first main scan cycle, only the second line is scanned, and in the second main scan cycle, the first and fourth lines are scanned. Thereafter, in each subsequent scan, odd-numbered and even-numbered lines separated by two lines are scanned until, in the final [(n/2)+1] scan, all n lines have been scanned.

Figure 5:
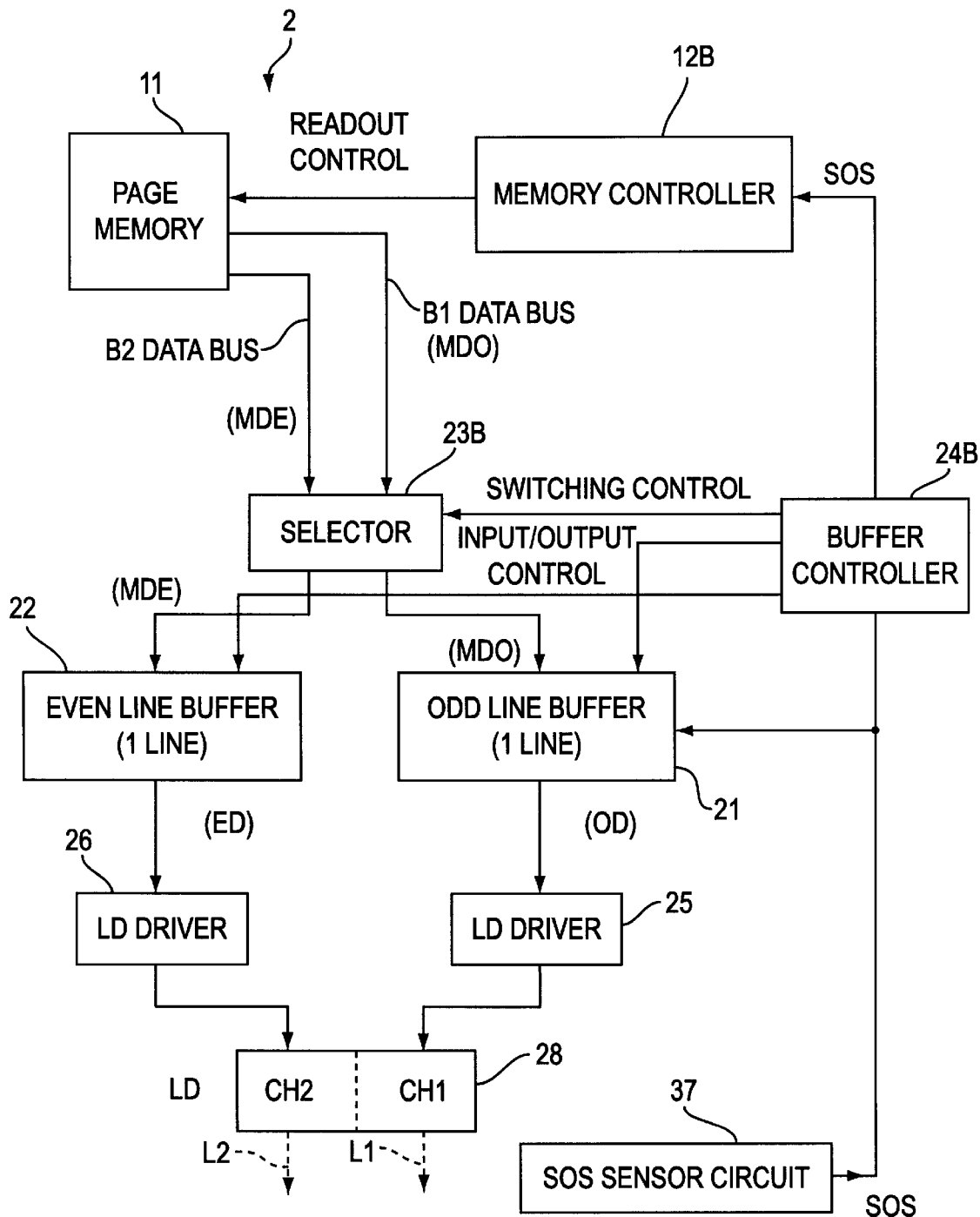
FIG. 5 is a block diagram of a second embodiment of the image writing device.
Figure 6:
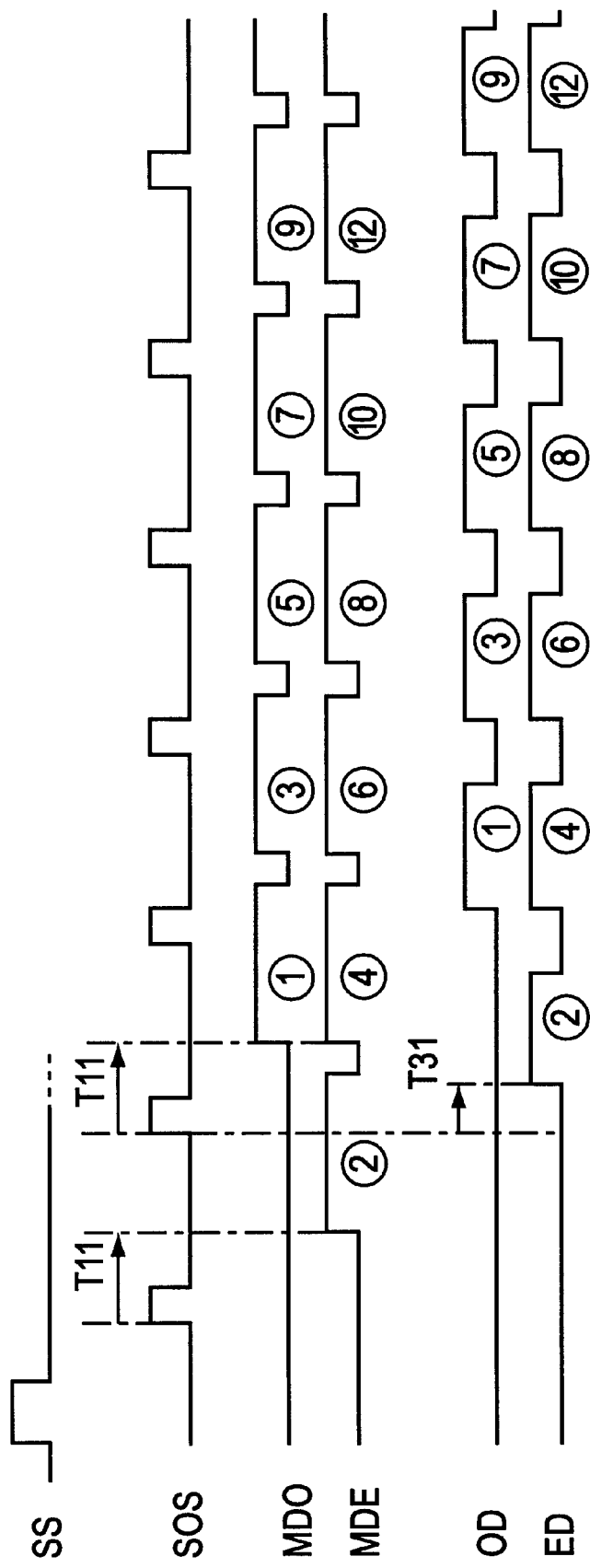
FIG. 6 is a timing chart of the operation of the image writing device of FIG. 5.

FIG. 5 is a block diagram of a second image writing device 2 corresponding to another embodiment of the present invention. The second image writing device 2 may be substituted for the image writing device 1 previously shown in FIG. 2. FIG. 6 is a timing chart of the operation of the image writing device 2 of FIG. 5.

Image writing device 2 is provided with two data buses B1 and B2 between page memory 11 and selector 23B, and is capable of simultaneously transmitting image data MDO and MDE of two pixels.

After signal SS is input as shown in FIG. 6, memory controller 12B starts timing delay time T11 from the input of the first signal SOS, and reads out only image data MDE of the second line after said delay time T11 is completed. The elapse of the delay time T11 is awaited after input of a second signal SOS, and the image data MDO of the first line and the image data MDE of the fourth line are read. Thereafter, the image data MDO and MDE of odd-numbered lines and even-numbered lines are read simultaneously at the moment said delay time T11 is completed for each input of signal SOS, and image data MDO and MDE are transferred to selector 23B in the proportion of two lines per 1 main scan cycle.

Buffer controller 24B stores the image data MDE of even-numbered lines transferred from page memory 11 in even-line buffer 22, and stores image data MDO of odd-numbered lines transferred from page memory 11 in odd-line buffer 21.

Buffer controller 24 times the delay time T31 for each input of signal SOS from the second such input, and reads out the image data MDE of one line from even-line buffer 22 at the moment said delay time T31 has elapsed, and transfers said image data to LD driver 26 as modulation data ED, and simultaneously therewith reads out the image data MDO of one line from odd-line buffer 21, and transfers said image data to LD driver 25 as modulation data OD. At the time of the first transfer (corresponding to the second line), the odd-line modulation data OD are not transferred. White space data may be stored beforehand in odd-line buffer 21 so as to not be transferred with modulation data OD.

Thus, multibeam scanning in the scanning sequence shown in FIG. 4 may be realized from the image writing device 2 using line buffers having a total capacity of two lines by transferring data from page memory 11 to LD drivers 25 and 26.

Figure 7:
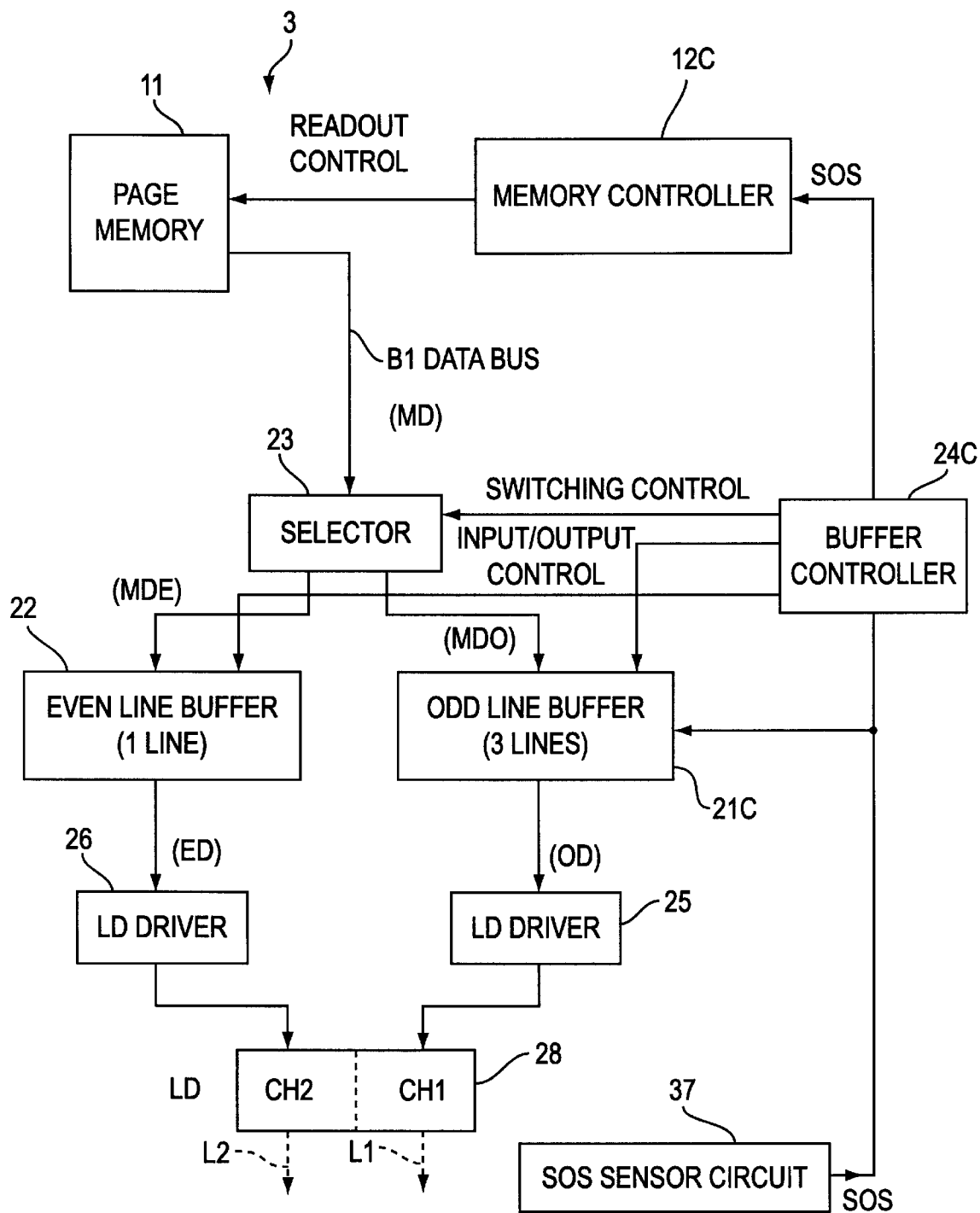
FIG. 7 is a block diagram of a third embodiment of the image writing device.
Figure 8:
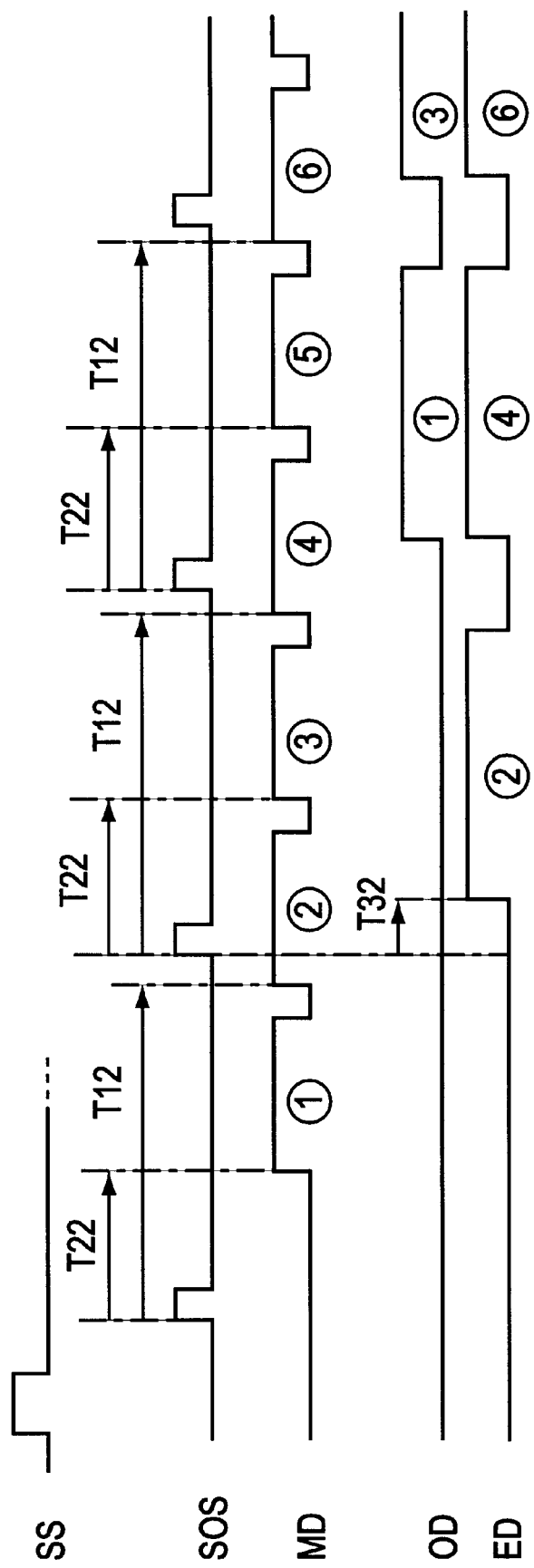
FIG. 8 is a timing chart of the operation of the image writing device of FIG. 7.

FIG. 7 is a block diagram of a third image writing device 3 corresponding to another embodiment of the present invention. The third image writing device 3 may be substituted for the image writing devices 1 and 2 previously shown in FIGS. 2 and 5, respectively. FIG. 8 is a timing chart of the operation of the image writing device 3 of FIG. 7.

Image writing device 3 is provided with an even-line buffer 22 which has a one-line capacity, and an odd-line buffer 21 which has a three-line capacity.

In image writing device 3, image data MD is serially transferred from page memory 11 to selector 23 pixel by pixel in the line array sequence.

That is, after signal SS is input, memory controller 12C starts timing the delay time T22 and the delay time T12 (T12>T22) from the input of the first signal SOS. The image data MD of the first line is read out the moment the delay time T22 has elapsed, and the image data MD of the second line is read out the moment the delay time T12 has elapsed. Thereafter, until the reading of all lines is completed, image data MD of odd-numbered lines and even-numbered lines are read out at the moment the delay times T22 and T12 elapse for each input of signal SOS, and said image data MD are serially transferred to selector 23 in the proportion of two-lines per one main scan cycle.

Buffer controller 24B stores the image data MDE of even-numbered lines transferred from page memory 11 in even-line buffer 22, and stores image data MDO of odd-numbered lines transferred from page memory 11 in odd-line buffer 21.

Buffer controller 24C stores the image data MDO of odd-numbered lines transferred from page memory 11 in odd-line buffer 21, and stores the image data MDE of even-numbered lines transferred from page memory 11 in even-line buffer 22.

Buffer controller 24C times the delay time T32 for each input of signal SOS from the second such input, and reads out the image data MDE of one line from even-line buffer 22 at the moment said delay time T32 has elapsed, and transfers said image data to LD driver 26 as modulation data ED, and simultaneously therewith reads out the image data MDO of one line from odd-line buffer 21, and transfers said image data to LD driver 25 as modulation data OD. At the time of the first transfer, the odd-line modulation data OD are not transferred. The delay time T32 is set such that the timing for reading each pixel from even-line buffer 22 is after the storage timing.

Although the readout from page memory 11 starts with the first line in the present (third) embodiment, the exposure of the first line occurs during the second scan. Thus, since odd-numbered lines have a longer wait time in the buffer, the capacity of odd-line buffer 21 must be greater than the capacity of the even-line buffer 22.

Thus, multibeam scanning in the scanning sequence shown in FIG. 4 may be realized from the image writing device 3 using line buffers having a total capacity of four lines by transferring data from page memory 11 to LD drivers 25 and 26.

Figure 9:
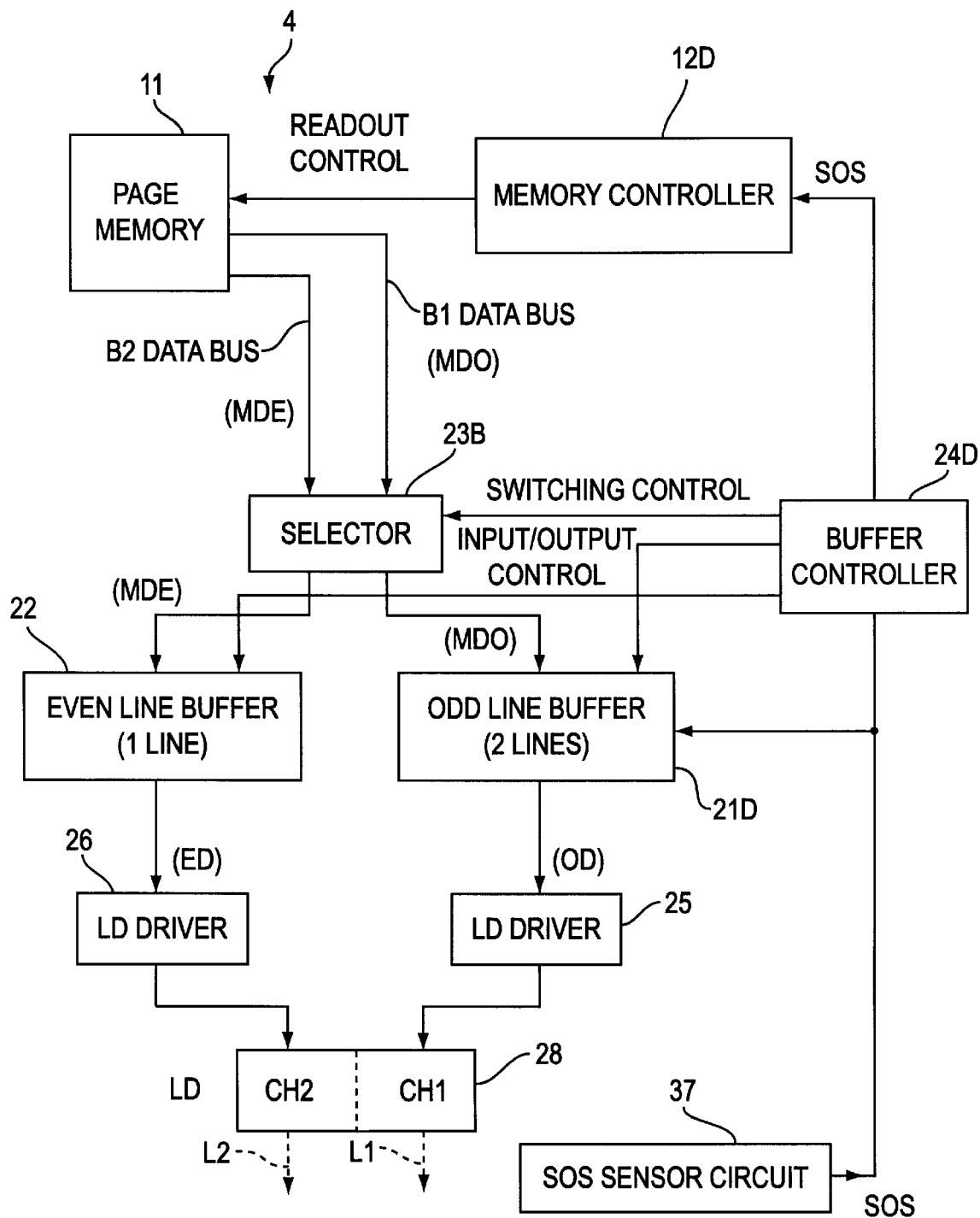
FIG. 9 is a block diagram of a fourth embodiment of the image writing device.
Figure 10:
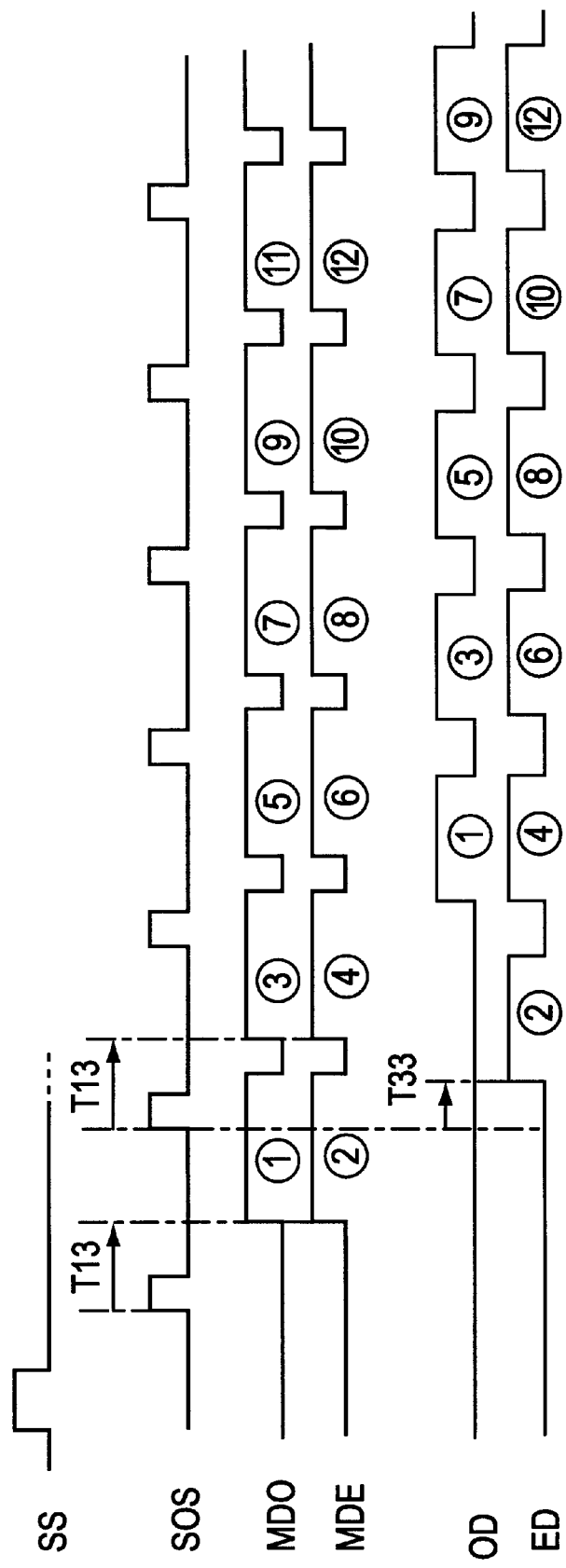
FIG. 10 is a timing chart of the operation of the image writing device of FIG. 9.

FIG. 9 is a block diagram of a fourth image writing device 4 corresponding to yet another embodiment of the present invention. Image writing device 4 may be substituted for the image writing devices 1, 2 and 3 previously shown in FIGS. 2, 5 and 7, respectively. FIG. 10 is a timing chart of the operation of the image writing device 4 of FIG. 9.

Image writing device 4 is provided with two data buses B1 and B2 between page memory 11 and selector 23B, and is capable of simultaneous transfer of image data MDO and MDE of two pixels. The capacity of the even-line buffer 22 is one line, whereas the capacity of the odd-line buffer 21C is two lines.

After input of signal SS as shown in FIG. 10, memory controller 12D starts timing the delay time T13 from the input of the first signal SOS, and from the moment said delay time T13 has elapsed, reads out the image data MDO of the first line and image data MDE of the second line. Thereafter, until all lines have been read, the image data MDO and MDE of odd-numbered lines and even-numbered lines are simultaneously read until the delay time T13 has elapsed for each input of signal SOS, and said image data MDO and MDE are transferred to selector 23B in the proportion of two lines per main scan cycle.

Buffer controller 24D stores image data MDO of odd-numbered lines transferred from page memory 11 in odd-line buffer 21, and stores image data MDE of even-numbered lines transferred from page memory 11 in even-line buffer 22.

Buffer controller 24D times the delay time T33 for each input of signal SOS from the second such input, and reads out the image data MDE of one line from even-line buffer 22 at the moment said delay time T32 has elapsed, and transfers said image data to LD driver 26 as modulation data ED, and simultaneously therewith reads out the image data MDO of one line from odd-line buffer 21, and transfers said image data to LD driver 25 as modulation data OD. At the time of the first transfer, the odd-line modulation data OD are not transferred.

Thus, multibeam scanning in the scanning sequence shown in FIG. 4 may be realized by the image writing device 4 using line buffers having a total capacity of three lines by transferring data from page memory 11 to LD drivers 25 and 26.

According to the embodiments shown in FIGS. 2 and 7, component costs can be reduced by using the minimum number of individual cables (harness) as data buses to output image data from page memory 11. Particularly in the embodiment shown in FIG. 2, the capacities of line buffers 21 and 22 can be minimized.

According to the embodiments shown in FIGS. 5 and 9, it is possible to reduce the time required for data transfers compared to line by line transfers so as to achieve high speed scanning because two lines of image data are simultaneously transferred from page memory 11 to selector 23B. For example, consider transferring an A3 size image at transfer speeds of 20 Mbps and resolution of 600 dpi between page memory 11 and selector 23B. The image width in the main scan direction is 297 mm, and the number of pixels in the main scan direction is 7,016. Accordingly, the time required to transfer 1 line is 350 $\mu$s. When transferring line by line as in the embodiment shown in FIG. 2, the scanning cycle must be set at about 750 $\mu$s, above the 2-line transfer time. In contrast, when transferring 2 lines simultaneously, a margin of about 374 $\mu$s can be added to the transfer time of 1 line of one main scan cycle.

Although a semiconductor laser of a dual beam output type is used as a light source in the previously described embodiments, a semiconductor laser array having an arrangement of adjacent single-beam type semiconductor lasers may be used. The number of laser beams L1 and L2 is not limited to two, and three or more may be used. In multibeam scanning, exposure of all lines may be accomplished in [(n/M)+(M−1)] scans. For example, when M=3, the scan objective line of each cycle may be set as shown in Table 1. Only the third line is the object in the first scan; the second and sixth lines are objects in the second scan; and the second, fifth, and ninth lines are objects in the third scan. Line skipping can be prevented by increasing the number of object lines from 1 to M for each cycle overlap.

TABLE 1

| | | MAIN SCAN CYCLE | | | | | | | | |
|---|---|---|---|---|---|---|---|---|---|---|
| | | 1 | 2 | 3 | 4 | 5 | 6 | ... | n/3 | n/3 + 1 | n/3 + 2 |
| SCAN LINE NUMBER | 1St beam | — | — | 1 | 4 | 7 | 10 | ... | n − 8 | n − 5 | n − 2 |
| | 2nd beam | — | 2 | 5 | 8 | 11 | 14 | ... | n − 4 | n − 1 | — |
| | 3rd beam | 3 | 6 | 9 | 12 | 15 | 18 | ... | n | — | — |

The image writing devices and methods oft the present invention may thus be realized by a simple circuit construction for multibeam scanning at uniform line intervals suitable for high resolution.

The present invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. An image writing apparatus for scanning with M individual light beams a recording surface line by line, wherein M is a natural number more than one, said image writing apparatus comprising:

at least one light source for generating said M individual light beams, said M individual light beams being arranged so that there are M scan lines between one of said M individual light beams and an adjacent one of said M individual light beams on the recording surface;

scan means for deflecting said M individual light beams generated by said at least one light source in a main scan direction, and further for moving the M individual light beams relative to the recording surface in a subscan direction perpendicular to said main scan direction, wherein a subscan speed is set such that each of said M individual light beams moves a distance equal to an M line pitch per one main scan cycle; and drive means for driving said at least one light source and for modulating said M individual light beams, wherein said drive means modulates only one of said M individual light beams in a first main scan cycle, and from a second main scan cycle to an Mth main scan cycle, the modulated individual light beams are added cumulatively one by one for each of said main scan cycle and in following main scan cycles, all of the M individual light beams are thereafter simultaneously modulated.

2. The image writing apparatus of claim 1 wherein said drive means comprises:

an image memory which stores image data;

M individual buffer memories provided for each of said at least one light source;

a memory controller which reads image data of each scan line from said image memory;

a buffer controller which (1) divides said read image data and stores the divided image data into said buffer memories so that each of said buffer memories stores image data of scan lines at (M−1) line intervals, and (2) reads image data from each of said buffer memories for every main scan cycle; and M drive circuits which independently modulate each of said light beams in accordance with the image data read by said buffer controller.

3. The image writing apparatus of claim 2 wherein said memory controller reads the image data from the image memory in scan sequence.

4. The image writing apparatus of claim 2 wherein said memory controller reads the image data from the image memory in line array sequence, and wherein one of said buffer memories has a multiple data line capacity for delaying outputting the image data to a corresponding one of said drive circuits.

5. The image writing apparatus of claim 2 wherein said memory controller simultaneously reads the image data of M lines in scan sequence.

6. The image writing apparatus of claim 2 wherein said memory controller simultaneously reads the image data of M lines in line array sequence, and one of said buffer memories has a multiple data line capacity for delaying outputting the image data to a corresponding one of said drive circuits.

7. The image writing apparatus of claim 1, wherein M=2.

8. The image writing apparatus of claim 1, wherein M is a natural number more than 2.

9. An image writing apparatus for multibeam scanning of a recording surface comprising:

page memory for storing all scanned image data in line array sequence;

a memory controller responsive to a reference signal for controlling outputs of said image data from the page memory;

a selector for selecting said image data from said page memory;

a plurality of buffer memories for storing said selected image data;

a buffer controller responsive to said reference signal for switchably controlling said selector, and for controlling input and output from said buffer memories;

a plural beam light source laser;

a plurality of laser drivers for driving said plural beam light source laser in response to data output from said buffer memories; and a sensor circuit for sensing an output from said plural beam light source laser and for outputting said reference signal to said memory controller and said buffer controller, wherein said memory controller simultaneously outputs from the page memory image data of multiple lines in scan sequence which is different from line array sequence.

10. An image writing method for scanning with M total individual light beams a recording surface line by line, wherein M is a natural number more than one, said method comprising the steps of:

(1) simultaneously generating said M individual light beams, said M individual light beams being arranged so that there are M scan lines between one of the M simultaneously generated light beams and an adjacent one of the simultaneously generated M individual light beams on the recording surface, wherein the step of generating said M individual light beams comprises the steps of:

(a) storing image data in an image memory;

(b) reading out image data corresponding to each scan line from said image memory;

(c) dividing and storing said read-out image data into M individual buffer memories, so that each of said buffer memories stores image data of scan lines at (M−1) line intervals;

(d) reading out image data from each of said buffer memories in accordance with every main scan cycle; and (e) independently modulating each of said M individual light beams in accordance with the image data read out from said buffer memories, wherein the step of modulating said M individual light beams comprises a sequence of modulating only one M individual light beam in a first main scan cycle, and from a second main scan cycle to an Mth main scan cycle the modulated M individual light beams are adding cumulatively one by one the modulated light beams for each of said main scan cycle, and in the following main scan cycles simultaneously modulating all of the M individual light beams;

(2) deflecting said simultaneously generated M individual light beams in a main scan direction;

(3) moving said simultaneously generated M individual light beams relative to the recording surface in a subscan direction perpendicular to said main scan direction, wherein a subscan speed is set such that each of said M individual light beams moves a distance equal to an M line pitch per one main scan cycle; and (4) repeating steps (1) through (3) until the entire recording surface has been scanned.

11. The image writing method of claim 10 wherein said image data from said image memory is read out in scan sequence.

12. The image writing method of claim 10 wherein said image from said image memory is read out in line array sequence, and wherein one of said buffer memories has a multiple data line capacity so as to delay outputting the image data from said buffer memory and thereby delay modulating a corresponding one of said light beams.

13. The image writing method of claim 10 wherein image data of M lines from said image memory is simultaneously read out in scan sequence.

14. The image writing method of claim 10 wherein said image data of M lines from said image memory is simultaneously read out in line array sequence, and wherein one of said buffer memories has a multiple data line capacity so as to delay outputting the image data from said buffer memory and thereby delay modulating a corresponding one of said light beams.

15. The image writing method of claim 10, wherein M is a natural number more than 2.

16. The image writing method of claim 10, wherein M=2.

17. An image writing apparatus for scanning a recording surface line by line, said image writing apparatus comprising:

at least one light source for generating at least two light beams, scan means for deflecting said at least two light beams generated by said at least one light source in a main scan direction, and further for moving the at least two light beams relative to the recording surface in a subscan direction perpendicular to said main scan direction, and drive means for driving said at least one light source and for modulating said at least two light beams, wherein odd numbered and even numbered lines separated by two lines are scanned until in a (n/2+1) scan all n lines have been scanned, wherein in a first main scan cycle, only a second line is scanned, and wherein in a second main scan cycle, a first and a fourth lines are scanned.

18. An image writing method for scanning with at least two light beams a recording surface line by line, said method comprising the steps of:

(1) simultaneously generating said at least two light beams, said at least two light beams being arranged so that there are two scan lines between one of the at least two light beams and an adjacent one of the at last two light beams on the recording surface, wherein the step of generating said light beams comprises the steps of:
  (a) storing image data in an image memory;
  (b) reading out image data corresponding to each scan line from said image memory;
  (c) dividing and storing said read-out image data into individual buffer memories,
  (d) reading out image data from each of said buffer memories in accordance with every main scan cycle; and
  (e) independently modulating each of said light beams in accordance with the image data read out from said buffer memories, wherein the step of modulating said light beams comprises a sequence of modulating only one light beam in a first main scan cycle, and from a second main scan cycle to a (n/2+1) main scan cycle the modulated light beams are adding cumulatively one by one the modulated light beams for each of said main scan cycle, and in the following main scan cycles simultaneously modulating all of the light beams;

(2) deflecting said light beams in a main scan direction; and (3) moving said light beams relative to the recording surface in a subscan direction perpendicular to said main scan direction, wherein odd numbered and even numbered lines separated by two lines are scanned until in a (n/2+1) scan all n lines have been scanned, wherein in a first main scan cycle, only a second lines is scanned, and wherein in a second main scan cycle, a first and a fourth line are scanned.

* * * * *